United States Patent [19]

Rangoni

[11] Patent Number: 5,120,109
[45] Date of Patent: Jun. 9, 1992

[54] MOTOR VEHICLE SEAT
[75] Inventor: Francesco Rangoni, Turin, Italy
[73] Assignee: SICAM S.p.A., Turin, Italy
[21] Appl. No.: 383,140
[22] Filed: Jul. 20, 1989
[30] Foreign Application Priority Data Jul. 25, 1988 [IT] Italy .................. 67707 A/88

[51] Int. Cl.5 ............................................. A47C 3/00
[52] U.S. Cl. ....................... 297/284 R; 297/339; 297/284 B; 297/284 C; 297/284 H
[58] Field of Search ............... 297/284, 460, 339, 338

[56] References Cited

U.S. PATENT DOCUMENTS

| 2,646,839 | 7/1953 | Hillman | 297/338 |
|---|---|---|---|
| 2,924,265 | 2/1960 | Himka | 297/339 X |
| 3,724,895 | 4/1973 | Brand | 297/338 |
| 4,155,593 | 5/1979 | Swenson et al. | 297/284 |
| 4,156,544 | 5/1979 | Swenson et al. | 297/284 |
| 4,387,874 | 6/1983 | Boisset | 297/339 |
| 4,641,884 | 2/1987 | Miyashita et al. | 297/284 |
| 4,717,203 | 1/1988 | Meiller | 297/284 |
| 4,834,455 | 5/1989 | Proctor | 297/284 |

FOREIGN PATENT DOCUMENTS 3634500 8/1987 Fed. Rep. of Germany ...... 297/284

Primary Examiner—Peter A. Aschenbrenner
Attorney, Agent, or Firm—Christie, Parker & Hale

[57] ABSTRACT

A motor vehicle seat can assume a plurality of different configurations to enable its optimal adaptation to the particular characteristics of the body of the seated person, ensuring a physiologically correct position of the shoulder region, the back, the lumbar region, the pelvis and the legs, as well as optimal distribution of the pressures on these regions, so that fatigue is reduced to a minimum even in the event of frequent and prolonged periods in the seat which would otherwise actually give rise to occupational disease.

6 Claims, 8 Drawing Sheets

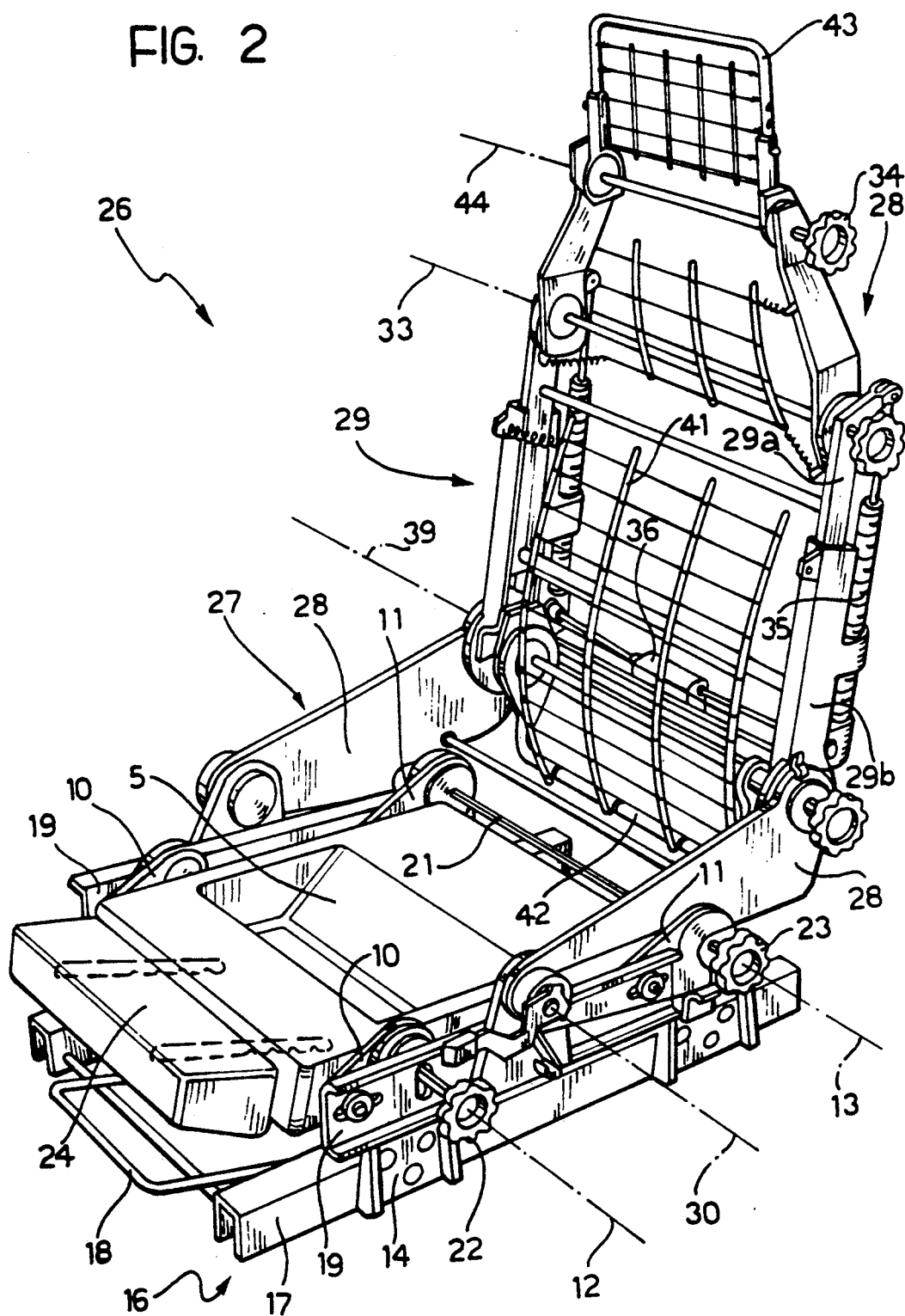

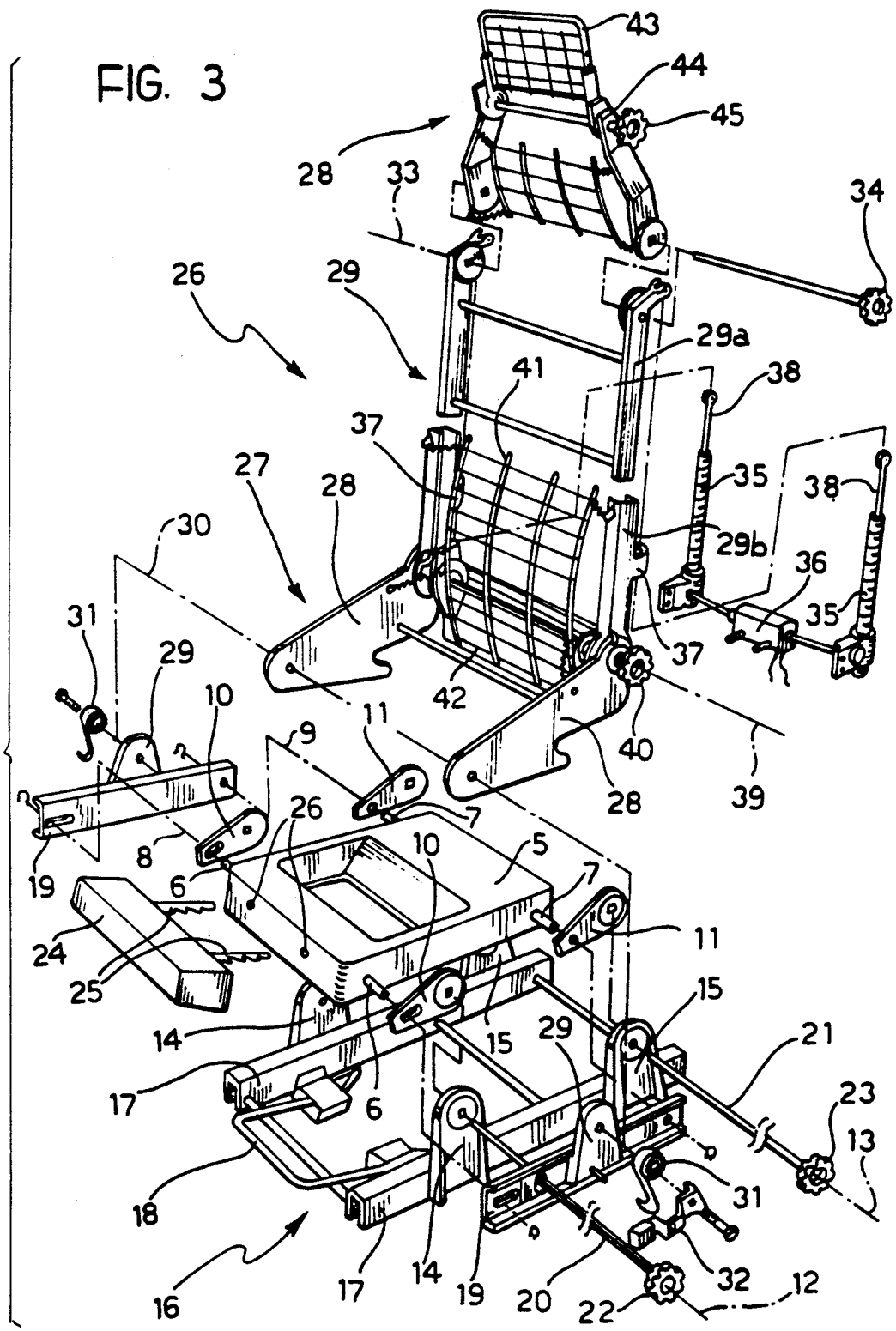

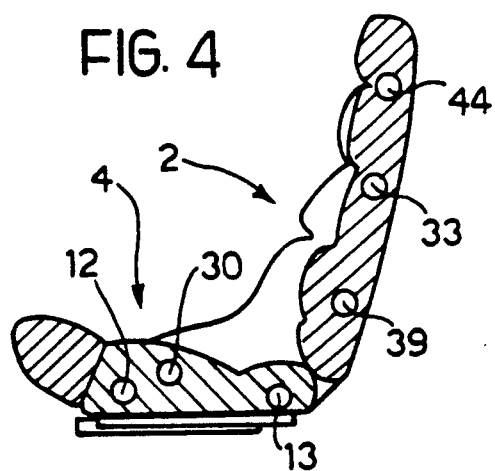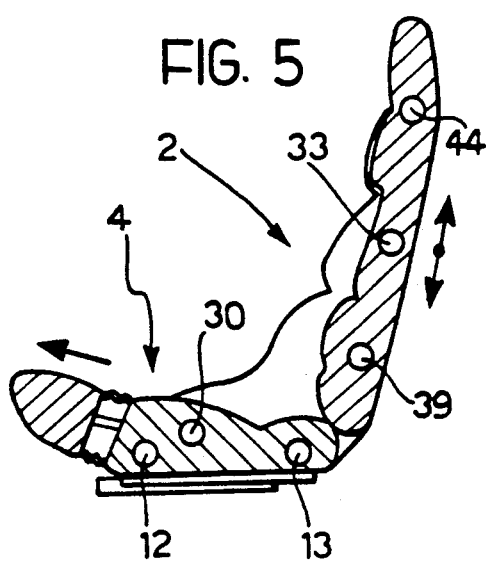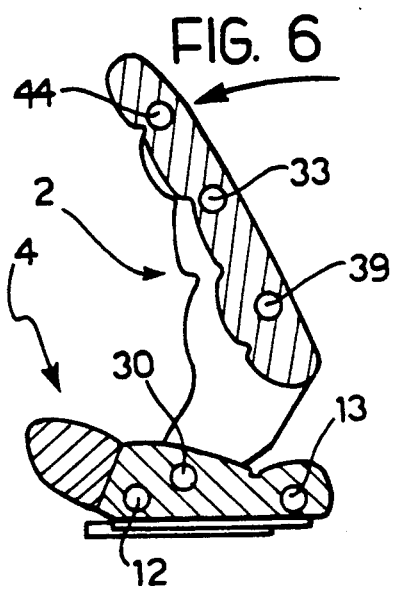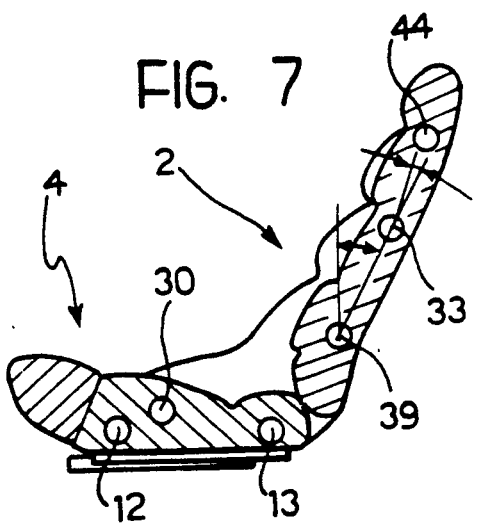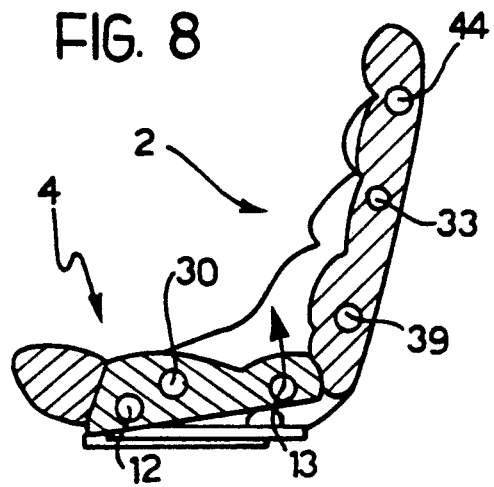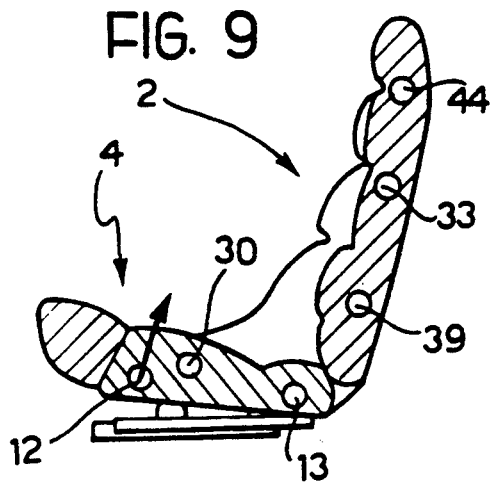

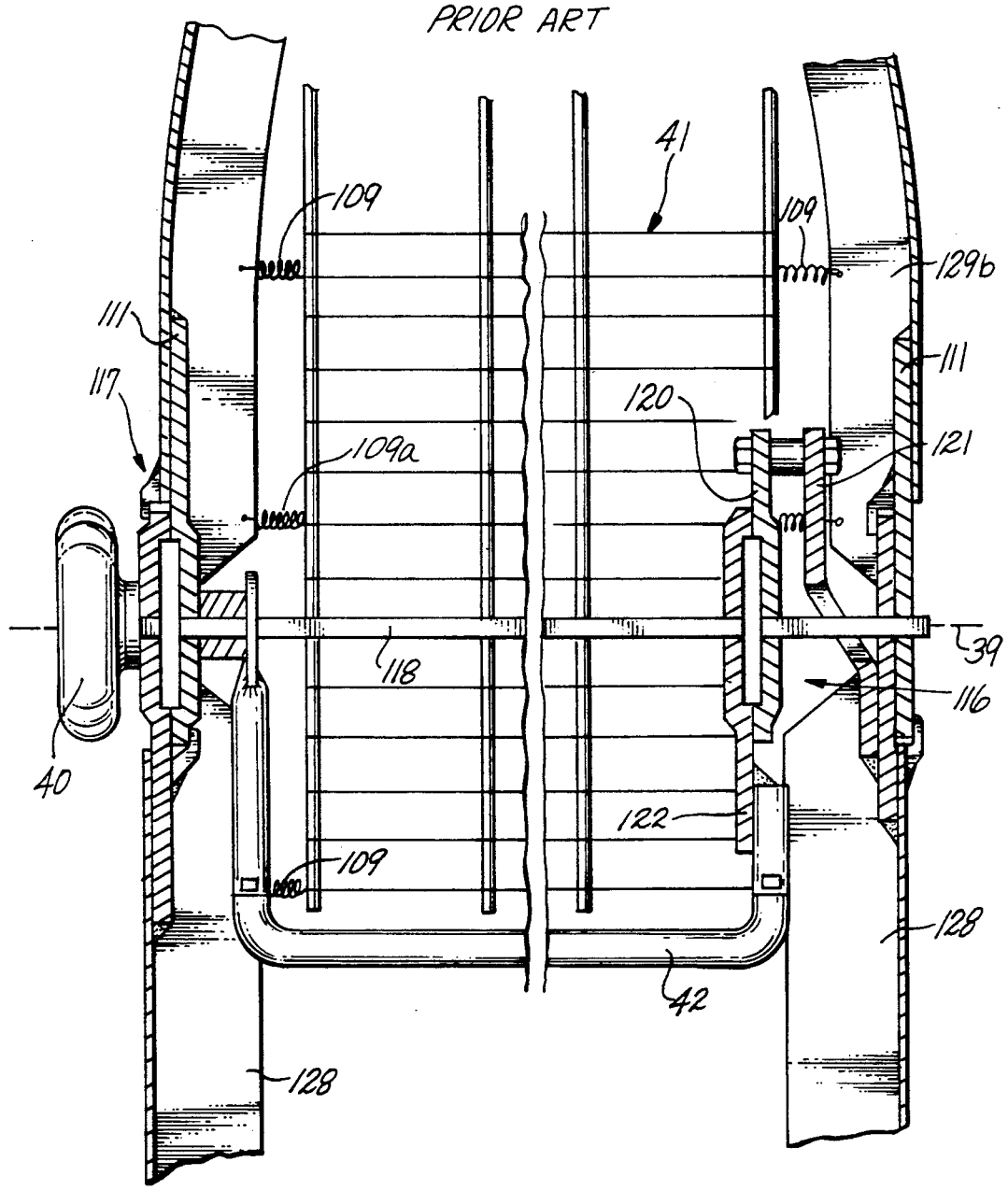

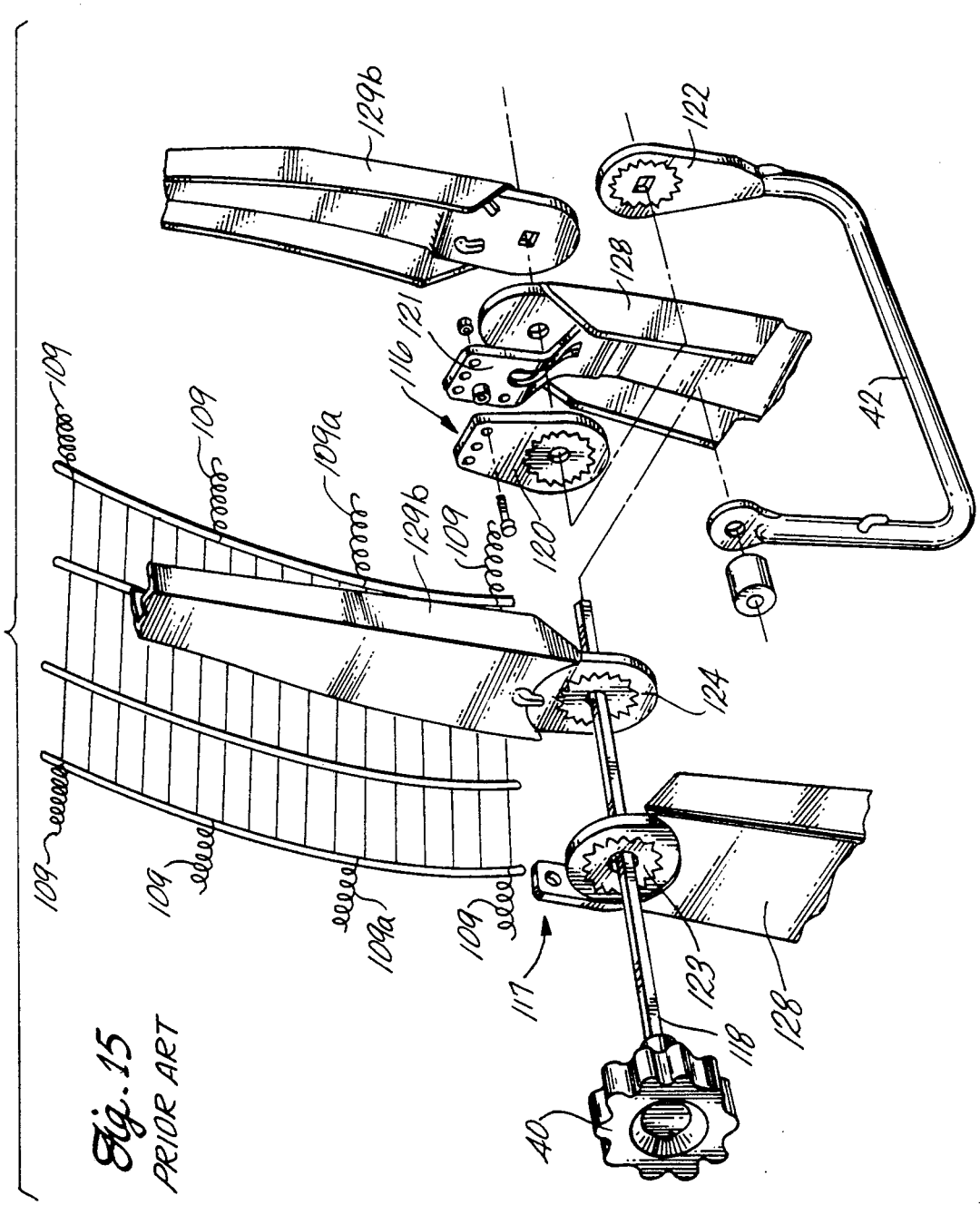

MOTOR VEHICLE SEAT

BACKGROUND OF THE INVENTION

The present invention relates to motor vehicle seats of the known type comprising:

a squab including a frame which is intended to be mounted on the floor of the motor vehicle with the interposition of guide means for adjusting the position of the seat longitudinally of the motor vehicle, and a backrest including a frame which is articulated at the bottom, about a first transverse axis, to a support structure fixed to the movable part of the longitudinal guide means, by means of a device which enables the angular position of the backrest to be adjusted relative to the transverse axis.

Recently, the constructional techniques relating to seats of the type indicated above have been directed increasingly to problems relating to the comfort of the user. On the one hand, there is the general problem of ensuring that the back, pelvis and legs of the seated person are supported as correctly as possible and, on the other hand, there is the problem caused by the considerable differences which may exist between possible users of the seat, in dependence on their height, weight and sex.

Notwithstanding the various studies which have already been carried out and the various propositions put forward, to the Applicant's knowledge, no motor vehicle seat has yet been produced which resolves the above problems in a completely satisfactory manner.

For example, various types of seat have been used which are provided with means for the adjustment of the curvature of the backrest in the region corresponding to the lumbar lordosis of the seated person. Whilst, on the one hand, they enable the lumbar region of the seated person's back to be supported correctly, these known solutions, on the other hand, generate new problems. For example, an increase in the curvature of the backrest to adapt it to a more pronounced lumbar lordosis at the same time creates a gap between the upper part of the backrest and the upper part of the back in the region adjacent the lordosis of the neck, which thus lacks support. Moreover, a different curvature of the backrest in the lumbar region generally forces the user to change the position of his back relative to the length of the motor vehicle, or causes a change in the distribution of the pressure exerted by the backrest on the back. It is essential, however, that the pressure distribution remains substantially constant under all conditions of use, in order to avoid the alteration of the optimum physiological conditions after a prolonged period in the seat. Finally, as already indicated, another problem results from the considerable differences which may exist between the physical characteristics of different users, particularly with reference to the vertical distance between the lordosis of the neck and the lumbar lordosis.

Another disadvantage of seats produced up to now lies in the fact that the lower axis of articulation of the backrest is situated adjacent the general plane of the backrest and therefore in a position a long way behind the imaginary axis of articulation between the legs and the body of the seated person. As a result of this situation, a variation in the inclination of the backrest also causes a variation in the vertical position of the seated person's back relative to the surface of the backrest. Thus, if the conformation of the surface of the backrest is adapted to the anatomy of the seated person's back with the backrest in a particular position, this condition is generally lost when the inclination of the backrest is changed.

Another problem common to all prior-art seats consists of the fact that the iliac region of the seated person is situated in correspondence with the angle formed between the squab and the backrest and therefore lacks support since the bulk of the adjacent parts of the padding of the backrest and the squab leaves an empty space in correspondence with the angle, which is not occupied by the body of the seated person.

SUMMARY OF THE INVENTION

The object of the present invention is to produce a motor vehicle seat which enables the satisfactory resolution of all the problems indicated above, and particularly of the problem relating to the correct support of the seated person's back.

In order to achieve this object, the seat according to the invention a primarily characterised by the fact that it has at least the following further characteristics:

a) the frame of the backrest includes an upper portion which is articulated to the rest of the frame of the backrest about a second transverse axis by means of a device which enables the angular position of the upper portion to be adjusted relative to the second transverse axis, the part of the backrest associated with the upper portion being intended to support the body of the seated person substantially in correspondence with the lordosis of the vertebral column in the upper region of the back;

b) the portion of the frame of the backrest which is situated beneath the second axis of articulation is composed of at least two parts mounted for sliding relative to each other vertically of the backrest and actuator means are provided for adjusting the relative positions of these parts and hence the vertical position of the second transverse articulation axis.

By virtue of the above characteristics, the user can easily adapt the backrest of the seat according to the invention to his own particular characteristics so as to obtain correct support in correspondence with the lordosis of the neck. On the one hand, the presence of an articulated upper part in the frame of the backrest actually enables the upper part to be inclined forwardly, so as to achieve the correct support of the region of the back which is situated at a height intermediate the level of the shoulder blades and the level of the neck. At the same time, the fact that the vertical position of the second axis of articulation can be varied enables this adaptation to be made to any physical configuration and particularly to any distance between the lordosis of the neck and the lumbar lordosis of the seated person.

Preferably, the seat according to the invention is also characterised in that the lower part of the frame of the backrest is provided with means for adjusting the curvature of the backrest in correspondence with the lumbar lordosis of the seated person.

According to a further preferred characteristic, already proposed in Italian patent application No. 67215-A/88 of 14th March 1988 the disclosure of which is incorporated by reference herein, the lumbar adjustment means comprise a resilient panel which is associated with the padding of the backrest and can assume a curved configuration, and is connected to the frame of the backrest by adjustment means which enable the degree of curvature of the panel to be varied, the region of maximum curvature of the panel being left in a substantially fixed position relative to the frame of the backrest.

The fact that the longitudinal position of the region of maximum curvature of the resilient panel does not vary with variations in the curvature of the panel enables the backrest to be adjusted according to the particular configuration of the lumbar lordosis of the seated person, without a variation in the distribution of the pressures exerted on the back of the seated person by the backrest. The risk of fatigue arising even after long periods in the seat is thus reduced to a minimum.

A further characteristic of the seat according to the invention lies in the fact that the lower part of the frame of the backrest includes two sides which extend forwardly and are articulated about the first transverse axis to the support structure which is fixed to the movable part of the longitudinal guide means, the first transverse axis being considerably further forward than the general plane of the backrest so as to be situated substantially on the same vertical line as the axis of articulation between the legs and the body of the seated person.

By virtue of these characteristics, the relative vertical displacement between the seated person's back and the surface of the backrest as a result of the pivoting of the backrest about its first axis of articulation is minimal. Thus, when the backrest is adapted to the particular configuration of the seated person's back with the backrest in a particular angular position, this condition is not altered as a result of the pivoting of the backrest about its first axis of articulation.

Finally, the frame of the squab of the seat according to the invention is supported so that it can be oriented—independently of the frame of the backrest—on the support structure which is fixed to the movable part of the longitudinal guide means.

By virtue of this characteristic, the squab can be arranged in the best position relative to the seat, in order to achieve the correct support of the body of the seated person even in correspondence with the iliac region. Moreover, the orientability of the squab also enables the lower parts of the thighs of the seated person to be supported correctly.

In one specific embodiment, the frame of the squab is connected to the support structure at the front and rear by means of connecting-rod elements which can be oriented angularly about respective transverse axes, so as to enable the positions of the front and rear edges of the squab to be varied independently.

Yet another preferred characteristic of the seat according to the invention lies in the fact that the upper part of the frame of the backrest, which is articulated about the second transverse axis, is in turn provided at its top with an articulated frame for a headrest.

Naturally, the adjustment devices associated with the various axes of articulation of the backrest and the squab can be made in any known manner and can be operated manually or by means of electric motors. In the latter case, a push-button panel for activating the various actuator devices is provided adjacent the seat. Known electronic devices may also be used for memorising the different positions of the adjustable parts of the seat.

Further characteristics and advantages of the present invention will become clear from the detailed description which follows with reference to the appended drawings, provided by way of non-limiting example, in which:

BRIEF DESCRIPTION OF THE DRAWINGS

FIG. 2 is a perspective view of the frame of the seat of FIG. 1, FIG. 3 is an exploded perspective view of the frame of FIG. 2, FIGS. 4-9 are schematic side views of the seat of FIG. 1, showing the various ways in which the seat can be adjusted, FIG. 12 is a partial schematic and enlarged vertical sectional view of a lower part of a frame of a seat according to the prior art, FIG. 15 is an exploded perspective view of the frame of FIG. 12 and is prior art.

In FIG. 1, a seat, generally indicated 1, comprises a backrest 2 provided with a headrest 3, and a squab 4. With reference to FIGS. 1 and 2, the squab comprises a frame 5, for example of pressed sheet metal, provided at the front and the rear with respective pairs of lateral pins 6, 7 which are aligned in pairs on two transverse axes 8, 9. The pins 6, 7 are articulated respectively to two pairs of connecting-rod elements 10, 11 which are mounted for rotation about two transverse axes 12, 13 on two pairs of lugs 14, 15. The lugs 14, 15 form part of a pressed-sheet-metal structure 16 including two guide channels 17 which are intended to be mounted for sliding on corresponding guide sections (not illustrated) fixed to the floor of the motor vehicle. Locking means of any known type (not illustrated), which can be released by means of a control lever 18, are associated with the structure 16 for locking it in the required position longitudinally of the motor vehicle, relative to the guide sections which are fixed to the floor of the motor vehicle.

Figure 1:
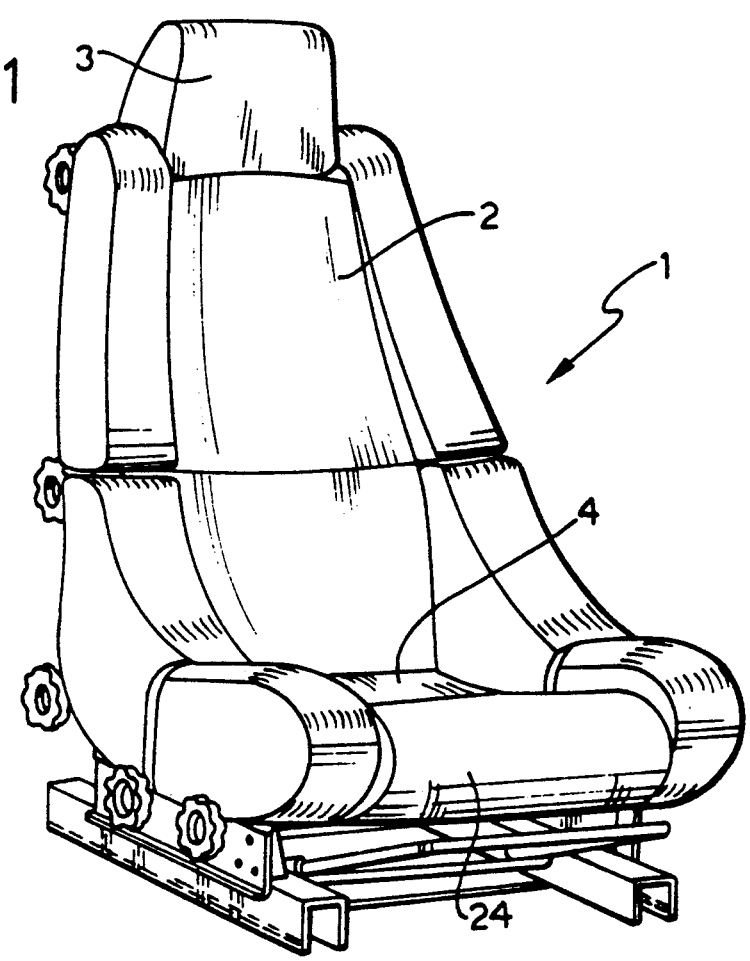
FIG. 1 is a schematic perspective view of one embodiment of the seat according to the invention.

The channels 17 and the corresponding guide sections fixed to the floor therefore constitute the means for the adjustment of the position of the seat longitudinally of the motor vehicle. The structural details of the guide means are not illustrated in detail since, as already indicated, they may be made in any known manner and do not fall within the scope of the present invention.

The ends of the connecting-rod elements 10, 11 are also interconnected by means of two lateral reinforcing elements 19, also of pressed sheet metal, which have apertures for the engagement of the pins 6, 7.

Two adjustment means of any known type are provided in correspondence with the axes of articulation 12, 13 of the connecting-rod elements 10, 11 for adjusting the angular positions of the connecting-rod elements relative to the axes. A preferred solution consists of the use of continuous adjustment devices with meshed eccentric sets of teeth, of the type usually used for the adjustment of the inclination of the backrests of motor vehicle seats. In this case, the shafts 20, 21 for operating the adjustment devices may be provided with knobs 22, 23 for manual operation, as shown in the drawings, or may be associated with electric operating motors.

Operation of the shafts 20, 21 enables the adjustment of the angular positions of the connecting-rod elements 10, 11 and hence the independent variation of the positions of the front edge and rear edge of the squab.

The front of the frame 5 of the squab is also provided with a thigh-support element 24 having two rods 25 which can be housed in apertures 26 in the frame 5 and locked in various possible positions by a technique similar to that conventionally used for varying the height of the headrest of the seat.

Still with reference to FIGS. 1 and 2, the frame of the backrest is generally indicated 26 and comprises a lower part 27, an upper part 28 and an intermediate part 29.

The lower part 27 of the backrest frame is constituted by two sides (in the embodiment illustrated, the frame of the backrest is also made of pressed sheet metal, though obviously the backrest frame and the squab frame could be made, for example, of plastics material), the sides being indicated 28. The sides 28 extend forwardly from the general plane of the backrest and at their front ends are articulated about a transverse axis 30 of the two lugs 29 forming part of the reinforcement elements 19. The articulation about the axis 30 is achieved by means of an adjustment device made in any known manner. Conventional devices for the adjustment of the backrest generally comprise continuous adjustment devices which use meshed eccentric sets of teeth, or discontinuous adjustment devices, that is, devices which provide for a finite number of different adjustment positions defined by the engagement of two toothed sectors. The details of the device used for the articulation 30 are not illustrated in the appended drawings, since they are of known type and do not fall within the scope of the present invention. In the specific embodiment shown, the adjustment device associated with the articulation axis 30 is a discontinuous device including coil springs 31 which tend to bias the backrest towards an erect position and a lever 32 which is adapted to release the toothed sectors (not illustrated) of the device to enable them to be engaged again in a different relative position. In any case, a device is provided in correspondence with the articulation axis 30, which enables the angular position of the entire backrest to be adjusted about that axis. By virtue of the forward position of the axis 30, the latter is situated substantially on the same vertical line (preferably with a tolerance ±15 mm horizontally) as the imaginary axis of articulation between the legs and the body of the seated person, and this enables the relative displacement between the back and the backrest as a result of a variation in the inclination of the backrest to be reduced to a minimum. The upper part 28 of the frame of the backrest is articulated to the intermediate part 29 about a transverse axis 33 by means of a further adjustment device of any known type (preferably of continuous type) provided with an operating knob 34 or associated with an electrical operating motor. The axis of articulation 33 is situated adjacent the lordosis of the neck of the seated person so as to enable the upper part of the backrest to be adapted to the particular configuration of his cervical lordosis.

At the same time, the intermediate part 29 is composed of two parts 29a and 29b mounted for sliding relative to each other vertically of the backrest, so as to enable the vertical position of the axis 33 to be varied in dependence on the particular characteristics of the seated person.

Figure 10:
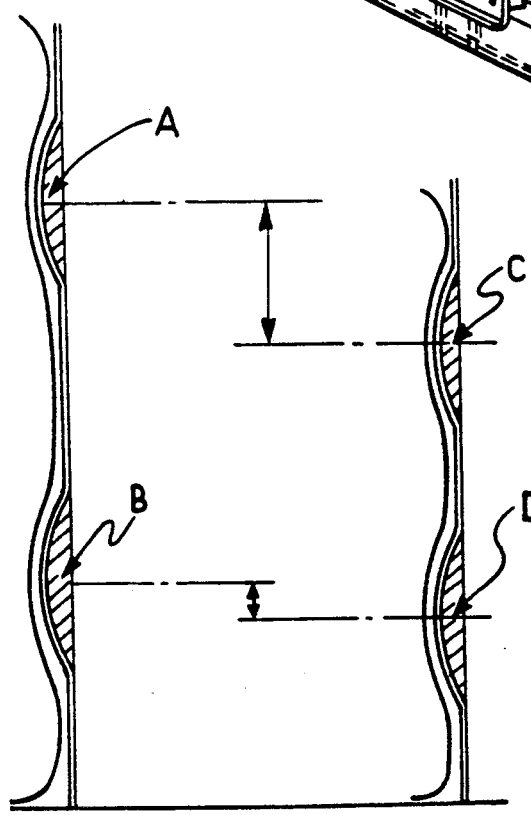
FIGS. 10 and 11 are two schematic drawings which show the ergonomic principles upon which the seat according to the invention is based

As can be seen in FIG. 10, the vertical positions of the lumbar lordosis and the lordosis of the neck, as well as their distance apart, can vary widely from one individual to another in dependence on height, weight and sex.

FIG. 10 shows schematically the profiles of a tall man and a short woman. The arrows A and B indicate the lordosis of the neck and the lumbar lordosis of the man, whilst the arrows C and D indicate the lordosis of the neck and the lumbar lordosis of the woman.

Figure 11:
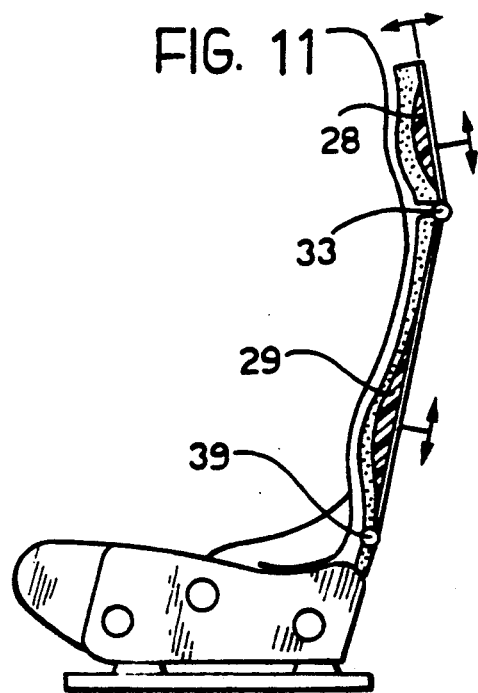

FIG. 11 shows that, in order to achieve correct support for both the lumbar lordosis and the lordosis of the neck, it is necessary to provide the backrest with an upper part 28 which is articulated to the intermediate part 29, and at the same time to provide for the variation of the vertical position of the axis of articulation 33 between the parts 28 and 29.

In the embodiment illustrated in FIGS. 2 and 3, the vertical adjustment of the intermediate part 29 is effected by means of a pair of screw actuators 35 operated by a single electric motor 36. Each screw 35 is engaged in a nut 37 fixed to the lower part 29b of the intermediate portion 29 of the backrest frame and, at its upper end, carries a shaft 38 (connected to the screw with the interposition of a rolling bearing, not visible in the drawings) which is linked to the upper part 29a.

According to a further characteristic, the frame of the backrest of the seat according to the invention is provided with means for varying the degree of curvature of the backrest in the region of the lumbar lordosis of the seated person.

In the embodiment illustrated, these means are made in accordance with the proposals of Italian patent application No. 67215-A/88 of 14th Mar. 1988. More particularly, the lower part 29b of the intermediate portion 29 of the backrest frame is articulated to the sides 28 about a transverse axis 39 by means of a continuous adjustment device provided with a manual operating knob 40 or associated with an electric motor. The frame of the backrest is also provided with a resilient panel 41, for example, of the type known commercially under the trade mark "PULIMAFLEX", comprising a plurality of parallel cords intersected by a series of metal cables. The region of maximum curvature of the panel 41 is anchored to the two sides 28 by means of helical springs. The upper edge of the panel 41, however, is anchored, again by means of helical springs, to the part 29b of the frame. Finally, the lower edge of the panel 41 is anchored to an auxiliary U-shaped element 42 mounted for rotation about the axis 39 and counter-rotated in synchronism with the part 29b of the frame by the same adjustment device 40 by the technique described in detail in the aforementioned Italian patent application. The mechanical characteristics of the springs are such as to ensure the correct distribution of the pressure on the surface of the body in contact with the seat. Counter-rotation of element 42 occurs in response to rotation of knob 40. More specifically, turning knob 40 clockwise, e.g., rotates, through a gear reducer, lower part 29b clockwise, thus bending the portion of panel 41 that is above fulcrum or axis 39 clockwise, causing the portion of panel 41 below axis 39 and thus element 42 to rotate counter clockwise.

In the above-mentioned Italian application, a pertinent part of which is described with reference to FIGS. 12 to 17, the prior art means to rotate the lower part and counter-rotate the U-shaped element are also shown. In these figures, lower part 129b and sides 128 correspond to lower part 29b and sides 28 of the previous embodiment, but are modified to appear similar to the drawing shown in the Italian application.

According to a conventional technique, panel 41 is connected to the backrest frame by means of two series of side helical springs 109 to the backrest frame. The backrest frame comprises sides 128 and lower part 129b. The lower end part 129b is articulate to the upper ends of the two sides 128, to allow for adjustment of the angular position of part 129b around transverse axis 39. The springs 109 which are connected to the upper part of panel 41 are anchored to part 129b (see FIG. 12) while the springs which are in correspondence with the lumbar area (one spring on each side, as indicated by reference number 109a) are connected to the sides 128. Finally, the springs 109 which are connected to the lower part of panel 41 are anchored, at their opposite ends, to U-shaped element 42 whose ends are also articulated to the two sides 128 around axis 39.

At the two hinges between part 129b and the sides 128, there are two adjustment devices 116, 117 of a known type which is usually used in motor-vehicle seats to allow for continuous adjustment of the inclination of the backrest. The two devices 116, 117 are controlled by a transverse shaft 118 having a square cross section, whose rotation can be driven by means of a knob 40. The inner structure of the adjustment devices 116, 117 is not described in detail, since, as already indicated, it is know per se and does not fall within the scope of the present invention. Furthermore, the elimination of such details of construction from the drawings makes the latter easier to understand. Each of such devices essentially comprises two plates which are reciprocally articulated and connected to each other by means of an epicyclic gear (rear reducer) which can be driven by means of the central shaft of the device and is able to cause a continuous rotation of the two plates relative to each other as a consequence of the rotation of this shaft. For the above indicated reasons, in FIG. 15, only the two plates of each of the devices 116, 117 are illustrated, while the details of the epicyclic gear between the two plates are omitted.

With reference to the illustrated example, device 116 comprises a first plate 120 which is fixed to a bracket 121 welded to the inner side of one side 128. The other plate 122 of adjustment device 116 forms an integral portion of one end of element 42, while the other end of such element is freely rotatable on the shaft 118. Thus, by turning knob 40 to rotate shaft 118, adjustment device 116 varies the angular position of element 42 relative to sides 128. The adjustment device 117 comprises two plates 123, 124 which are connected to one side 128 having the corresponding lower part 129b articulated to it. In this way, turning knob 40 changes the angular position of lower part 129b relative to the two sides 128.

Figure 13:
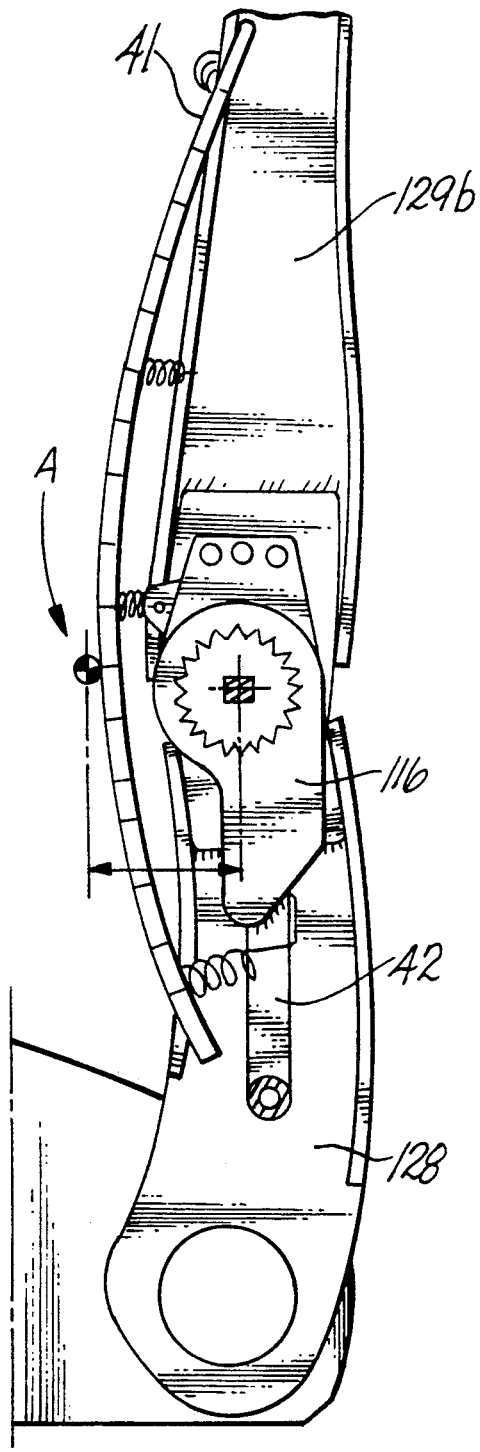
FIGS. 13 and 14 are schematic side views of the frame of FIG. 12 showing prior art with minimum and maximum curvature positions thereof to illustrate ergonomic principles upon which the seat according to the invention is based.
Figure 14:
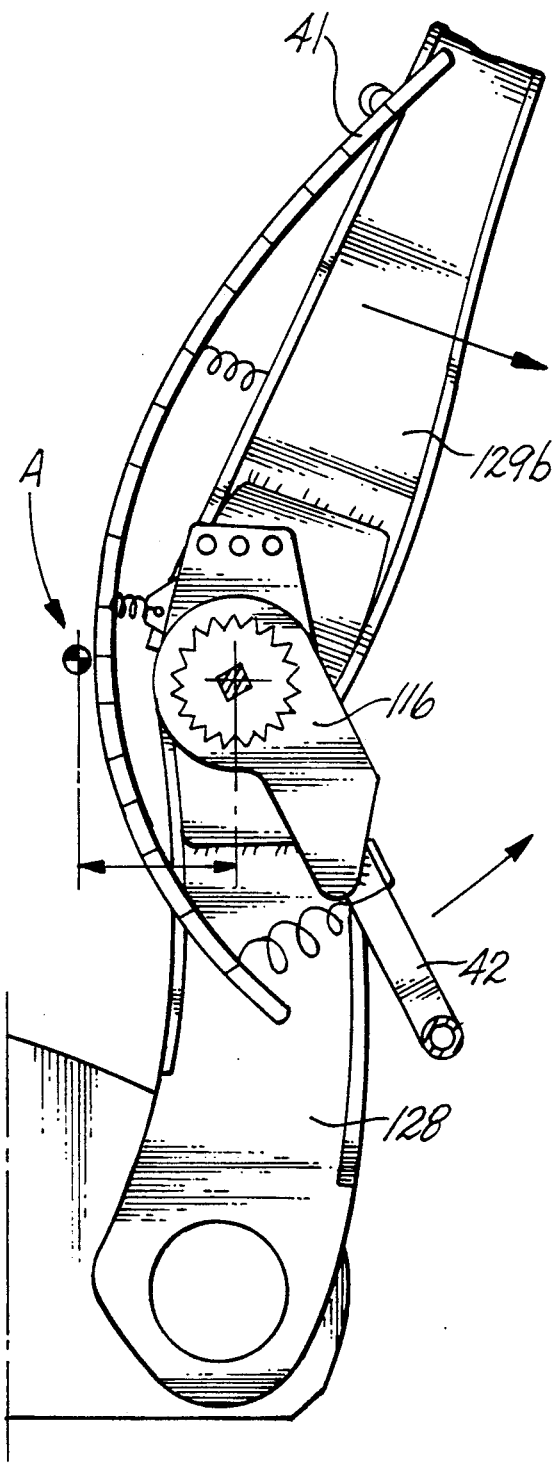
Figure 17:
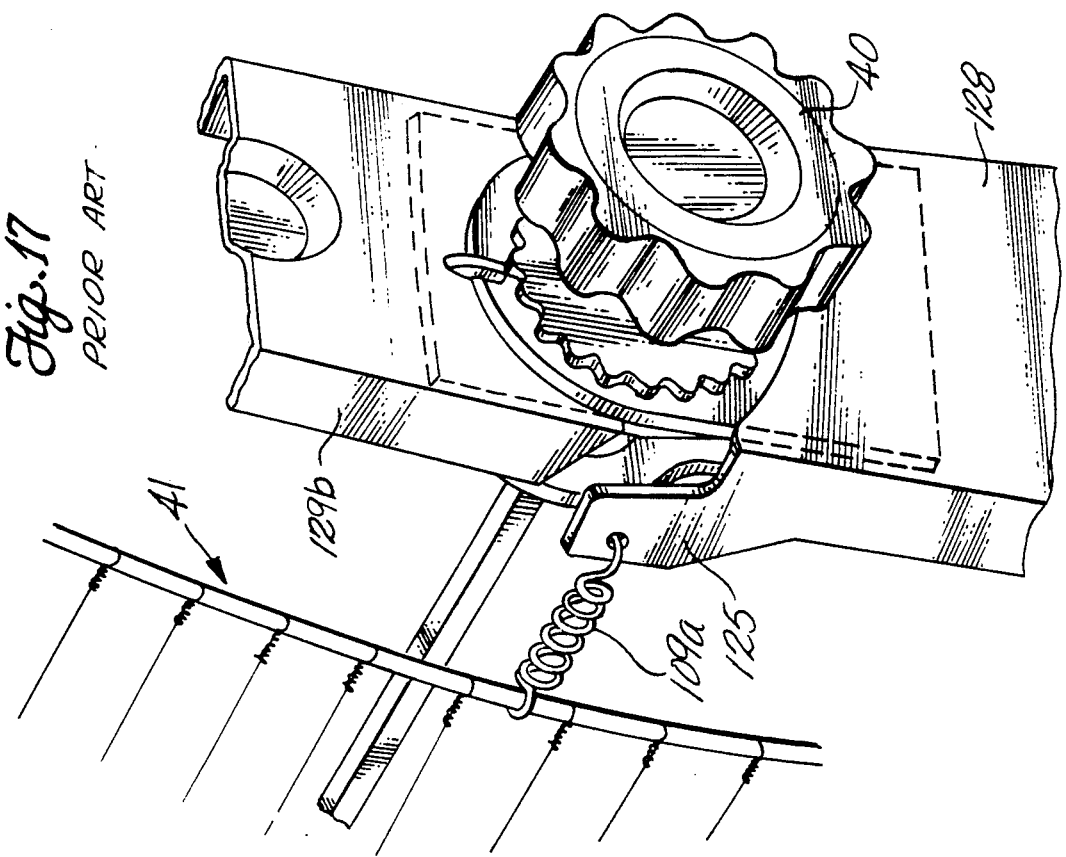
FIGS. 16 and 17 are prior art enlarged perspective views of the frame of FIG. 12 to illustrate details of the frame.
Figure 16:
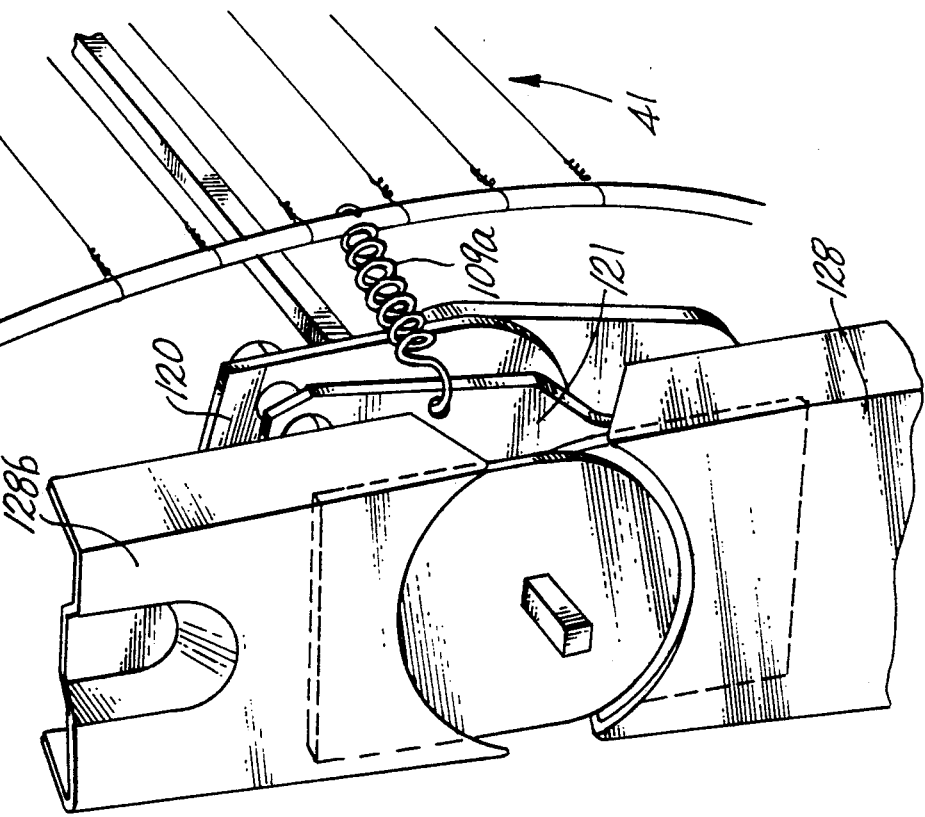

The arrangement is such that the action on knob 40 causes a simultaneous rotation of lower part 129b forwardly or rearwardly and element 42 rearwardly or forwardly, respectively, to vary the curvature of panel 41. In fact, as already indicated, the two helical springs 109a are anchored to the sides 128. In particular, one of such springs is anchored to a bracket 121 (FIG. 16) while the other spring 109a is anchored to an appendage 125 of the corresponding sides 128. As already indicted above, the springs 109 which are located above springs 109a are anchored to lower part 129b, while springs 109 which are located below springs 109a are anchored to element 42. As a consequence of this, the forward or rear simultaneous rotation of lower parts 129b and element 42 causes a longitudinal displacement, with reference to the longitudinal direction of the motor vehicle, rearwardly or forwardly of the upper edge and of the lower edge of panel 41, with a corresponding variation of the curvature of the panel. At the same time, the longitudinal position of the area of maximum curvature of the panel indicated by A in FIGS. 13, 14 remains substantially constant. FIGS. 13 and 14 show in cross section panel 41, in the condition of minimum and maximum curvature, respectively.

Obviously, by varying the degree of curvature of the panel, a variation is obtained of the reaction which the backrest exerts against the back of the seated person, at the lumbar region. Such variation, as it appears clearly from the foregoing, is obtained, contrary to what happens in heretofore known seats, without modifying the longitudinal position of point A and therefore without compelling the occupant of the seat to move forwardly or rearwardly on the seat itself in spite of a change in the curvature of panel 41.

The operation of the adjustment device 40 therefore causes a variation in the curvature of the resilient panel without altering the spatial position of the region of maximum curvature of the panel. It is thus possible to adapt the curvature of the backrest to the particular configuration of the lumbar lordosis of the seated person, without varying the position of maximum curvature of the backrest longitudinally of the seat, that is, without varying the distribution of the pressures exerted by the backrest on the back of the seated person.

Finally, the upper part 28 of the backrest frame is provided in turn with an upper frame 43 for a headrest of adjustable height, articulated to the part 28 about an axis 44 by means of a continuous adjustment device having a manual operating knob 45 or perhaps also associated with an electric operating motor.

FIG. 4 shows a schematic side view of the seat according to the invention, with its various axes of articulation. In FIG. 5, the arrows refer to the fact that the front thigh-support 4 and the vertical position of the articulation axis 33 can be adjusted.

FIG. 6 shows that it is also possible to provide a device in correspondence with the axis 30, for enabling the seat to be tilted forwards for use in two-door motor cars to enable access to the rear seats. The arrows in FIG. 7 refer to the fact that the curvature of the backrest can be adjusted in the lumbar region and the angular position of the upper part of the backrest can be adjusted to achieve correct support in correspondence with the lordosis of the neck. Finally, FIGS. 8 and 9 relate to the various possible adjustments of the position of the squab of the seat.

Clearly, any technology may be used to produce the frame of the squab and the frame of the backrest, as well as their padding. Preferably, padding provided with a subframe which can rapidly be connected to and released from the relative support frame is used.

Naturally, the principle of the invention remaining the same, the forms of embodiment and details of construction may be varied widely with respect to those described and illustrated, without thereby departing from the scope of the present invention.

I claim:

1. A seat for a motor vehicle, comprising:
   a support structure for mounting on a floor of the motor vehicle with guide means disposed between the floor and the support structure for longitudinally adjusting the position of the seat with respect to the vehicle;

a squab including a frame connected to said support structure;

a backrest including a frame having an upper portion, a lower portion and a portion intermediate to said upper and lower portions, said lower portion being articulated at its bottom to said support structure about a first transverse axis, a first device for adjusting the angular position of the backrest around said first transverse axis relative to said support structure, said upper portion of said backrest frame being articulated at its bottom to said intermediate portion about a second transverse axis, a second device for adjusting the angular position of said upper portion around said second transverse axis relative to said intermediate portion, said upper portion being adapted for supporting the body of a seated person substantially in correspondence with the lordosis of the vertebral column in the upper region of the seated peron's back, said intermediate portion of said backrest frame comprising at least two parts mounted for sliding relative to each other substantially vertically of the backrest, actuator means being provided for adjusting the relative positions of these two parts and hence the vertical position of said second transverse articulation axis, said intermediate portion of the backrest frame being articulated to said lower portion about a third transverse axis, a third device for adjusting the angular position of said intermediate portion around said third transverse axis relative to said lower portion, said backrest further comprising an auxiliary support element mounted for rotation about said third transverse axis relative to said lower portion of said backrest frame, said third device including means for counter rotating said auxiliary support element in synchronism and in an opposite direction relative to the rotation of said intermediate portion when said third device is operated to adjust the angular position of said intermediate portion, said backrest further including a resilient panel associated with the padding of said backrest for assuming a curved configuration substantially in correspondence with the lumbar lordosis of the seated person, said resilient panel having an upper part anchored to said intermediate portion of said backrest frame and a lower part anchored to said auxiliary support element so that the degree of curvature of the panel varies in response to rotation of said intermediate portion and counter rotation of said auxiliary support element around said third axis, said resilient panel having an intermediate part in the region of the apex of its curvature which is anchored to said lower portion of said backrest frame so that the position of said intermediate part of said resilient panel relative to the lower portion of said backrest frame remains substantially the same when the curvature of said resilient panel varies in response to operation of said third device.

2. A seat according to claim 1, wherein the lower part of the frame of the backrest includes two sides which extend forwardly and are articulated about said first axis to the support structure, the first transverse axis being considerably further forward than the general plane of the backrest so as to be situated substantially on the same vertical line as the axis of articulation between the legs and the body of the seated person.

3. A seat according to claim 1, wherein the frame of the squab is supported so that it can be oriented independently of the backrest frame on the support structure which is fixed to the movable part of the longitudinal guide means.

4. A seat according to claim 3, wherein the frame of the squab is connected to the support structure at the front and rear by means of connecting-rod elements which can be oriented individually about respective transverse axis so as to enable the positions of the front and rear edges of the squab to be varied independently.

5. A seat according to claim 1, wherein the top of the upper part of the backrest frame which is articulated about the second transverse axis is in turn provided with an articulation frame for a headrest which is adjustable in position.

6. A seat according to claim 1, wherein the squab is provided with a front thigh-support element whose position can be adjusted longitudinally of the motor vehicle.

* * * * *

UNITED STATES PATENT AND TRADEMARK OFFICE
CERTIFICATE OF CORRECTION

PATENT NO. : 5,120,109
DATED : June 9, 1992
INVENTOR(S) : Francesco Rangoni

It is certified that error appears in the above-identified patent and that said Letters Patent is hereby corrected as shown below:

Column 4, line 14, after "based" insert a comma.
Column 5, line 21, after "indicated" insert -- as --.
Column 6, line 64, change "counter clockwise" to
          -- counterclockwise --.
Column 7, line 9, change "articulate" to -- articulated --.
Column 7, line 30, change "know" to -- known --.
Column 7, line 65, change "indicted" to -- indicated --.
Column 8, line 11, after "41" delete ", in".

Column 10, line 7, change "counter rotation" to
          -- counterrotation --.
Column 10, line 35, after "transverse" change "axis" to
          -- axes --.

Signed and Sealed this

Twenty-first Day of December, 1993

Attest:

BRUCE LEHMAN

*Attesting Officer*              *Commissioner of Patents and Trademarks*